UNITED STATES PATENT OFFICE.

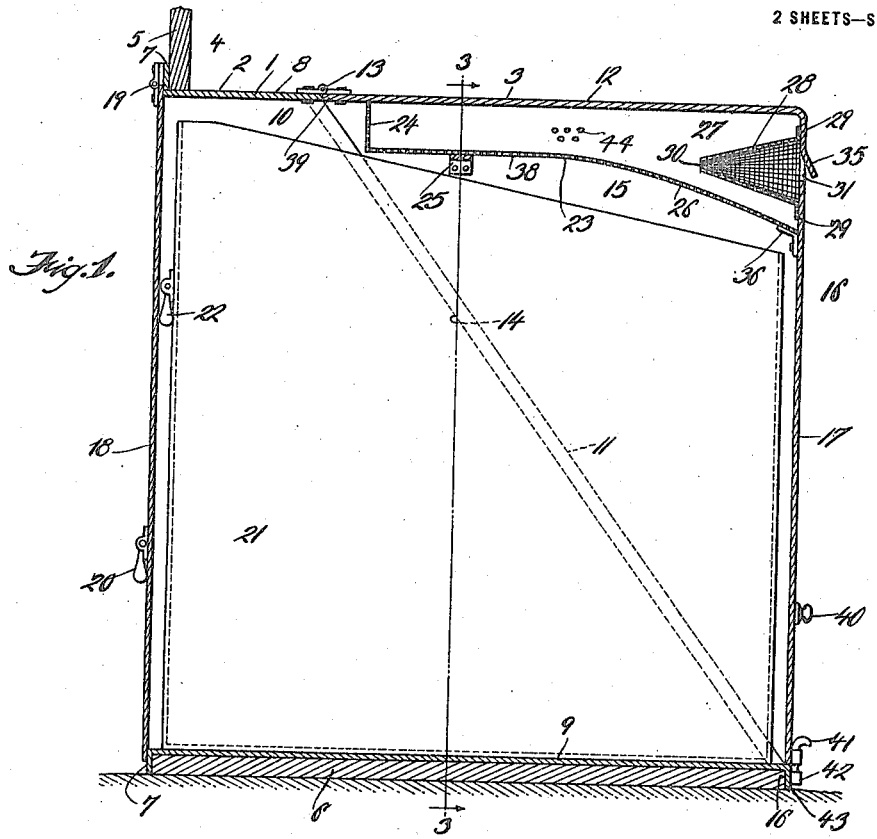

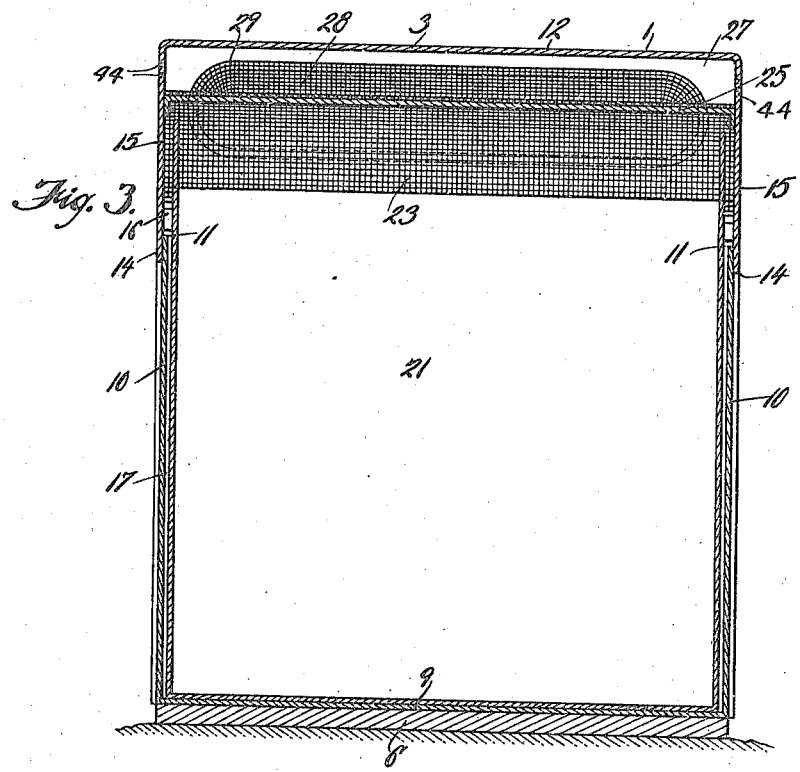
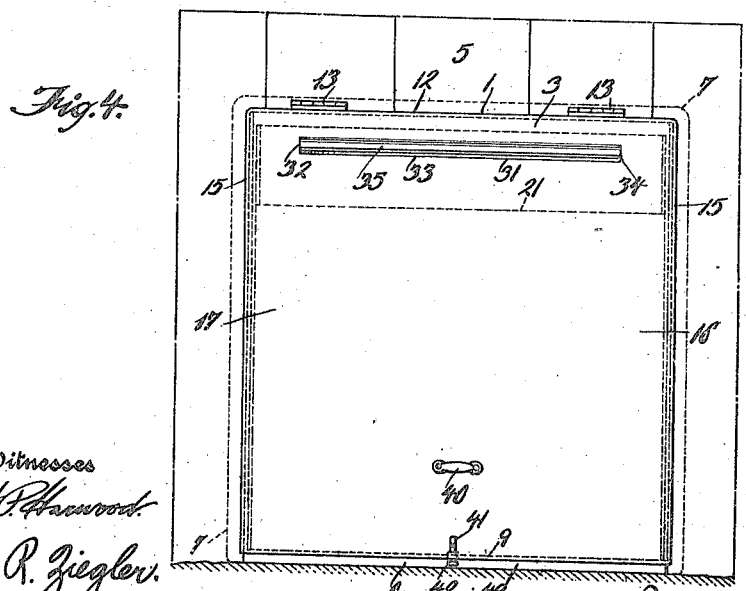

GEORGE H. SIPP, OF PHILADELPHIA, PENNSYLVANIA.

COMBINED RECEPTACLE-CASING AND FLY-TRAP.

1,249,528.  
Specification of Letters Patent.  
Patented Dec. 11, 1917.

Application filed January 25, 1917. Serial No. 144,367.

*To all whom it may concern:*

Be it known that I, GEORGE H. SIPP, a citizen of the United States, residing at Philadelphia, in the county of Philadelphia and State of Pennsylvania, have invented certain new and useful Improvements in Combined Receptacle-Casings and Fly-Traps, of which the following is a specification.

My invention consists of a combined receptacle casing and fly trap. One object of my invention is to provide a receptacle casing which can be conveniently used as a closure for garbage receptacles.

Another object is to so construct said casing that a portion thereof will form a fly trap which is so arranged with respect to the other portions of the casing that when the casing sections are closed, the trap will be held in an operative position, and when the sections are open, the trap portion may be easily scalded to kill the flies and then readily slid into such position that the dead flies will fall into the garbage receptacle within the casing.

A further object is to so make my invention that it will be of simple construction and can be manufactured and sold at a low cost.

These objects, and other advantageous ends which will be described hereinafter, I attain in the following manner, reference being had to the accompanying drawings in which—

Figure 1 is a sectional side elevation of my invention.

Fig. 2 is a front elevation of Fig. 1 on a slightly reduced scale.

Fig. 3 is a section on the line 3—3 of Fig. 1.

Fig. 4 is a rear elevation of Fig. 1 on a slightly reduced scale.

Fig. 5 is a fragmentary section showing a resilient support for a screen which forms a part of my invention and which I may employ if I so desire.

Referring to the drawings, my improved casing 1 includes two sections 2 and 3. The section 2 is designed to be extended through a hole 4 in a fence or partition 5, such for example as the fence of a dwelling house which borders on an alley or cartway. The section 2 rests upon a board or other supporting foundation 6 and is preferably made of galvanized sheet iron which is rectangular in cross section and provided with flanges 7 which may be attached to the outer surface of the fence 5 in any suitable manner.

The upper portion 8 of the section 2 is comparatively short with respect to the base portion 9 of said section, and the side portions 10 have their rear edges 11 extending at an angle rearwardly. The section 3 has an upper portion 12, the forward edge of which is hinged at 13 to the rear edge of the upper portion 8 of the section 2.

The forward edges 14 of the sides 15 of the section 3 also extend at an angle rearwardly and overlap the edges 11 of the section 2 so that there is an angular parting between said two sections as clearly shown in Fig. 1. This angular parting extends substantially to the rear end 16 of the casing, the section 3 having a rear portion 17 which completes the closure.

A gate 18 is hinged at its upper edge as shown at 19 to the upper flange of the section 2 and forms a closure for the front of the receptacle. This gate is preferably provided with a handle 20 to facilitate the opening thereof and to permit the removal of a garbage receptacle 21 located within the casing.

The front face of the receptacle 21 is also preferably provided with a handle 22 whereby it may be easily slid out of the casing when the gate 18 is open. A screen 23 is located within the upper portion of the section 3 and extends between the inner surfaces of the sides 15. This screen 23 has an upwardly turned flange 24, the free edge of which normally engages the lower surface of the upper portion 2 of said section 3 (see Fig. 1).

A bar or beam 25 has its ends secured to the inner surfaces of the sides 15 and supports the screen 23 adjacent its forward end. The screen 23 at its rear end is slightly curved downwardly as shown at 26. The function of this curved portion is two-fold. It prevents the screen 23 from dropping entirely out of the section 3 when the latter is raised on its hinge 13 as will hereinafter be more fully described and it also provides an enlarged chamber 27 between the screen and the upper and rear portion of the section 3 to permit the insertion of a baffle screen 28, the latter at its rear edges being flanged as shown at 29 and secured to the inner surface of the rear portion 17.

The baffle 28 is tubular in cross section and tapers inwardly, the inner end being open as shown at 30, the outer end being comparatively wide and communicating with a slot 31 formed in the rear portion 17. This slot is produced by cutting or punching the rear portion 17 along the lines 32, 33, and 34 to produce a tongue 35 which is bent rearwardly and extends at an angle downwardly as shown in Fig. 1. The tongue 35 thus produced acts as a shed to prevent rain water from entering the slot 31 but at its lower edge is sufficiently spaced from the rear portion 17 to permit flies or other insects to enter chamber 27 through the slot 31 and baffle 28.

The forward end of the screen 23 is preferably spaced by an angle bracket 36 and the screen 23 thus forms a partition which isolates the flies from the remaining portion of the interior of the casing and also traps them, since it is practically impossible for them to return through the contracted opening in the end 30 of the baffle 28 after once they have entered the chamber 27.

While the frictional engagement of the turned portion 24 with the section 3 is ordinarily sufficient to prevent longitudinal sliding movement of the screen 23 when the section 3 is raised, nevertheless in some instances I may employ the supporting structure illustrated in Fig. 5 where instead of having the bar 25 in direct engagement with the screen 23, resilient fingers 37 are secured to the bar 25 and their free ends 38 support and brace the turned portion 24 against the upper portion 12 of the section 3.

It will be noted that the forward portion 38 of the screen 23 which lies between the turned end 24 and the curved portion 26, is substantially parallel with the upper portion 12 of the section 3, so that when the latter is raised on its hinge 13, the screen 23 may be slid longitudinally until the portion 24 has passed beyond and below the edge 39. Any flies or other insects which have been previously trapped and scalded within the screen partition can then be dumped into the receptacle 21. The screen may again be slid into its normal position and the section 3 again lowered into its closed position.

The rear portion 17 is preferably provided with a handle 40, so that it can be easily raised and this section is also provided with a catch 41 having a portion which engages a socket 42 on the rear flanged end 43 of the base 9, thus locking the two sections together.

The section 3 at its sides is perforated at 44, the perforations being sufficiently large to permit light to enter the chamber 27 but are small enough to prevent the escape of the flies. The perforations 44 admit light to the chamber and thereby serve to induce the flies to enter.

By my invention a very desirable receptacle casing is provided, and is especially suitable for garbage receptacles, since the garbage may be readily deposited merely by raising the section 3, the angular construction of the parting between the sections permitting a large portion of the receptacle 21 to be exposed so that the garbage may be dumped therein with practically no effort.

Furthermore, the casing will be kept practically free from swarms of flies which, if the screen partition and trap was not provided, would continually hover around the receptacle.

Another advantage of my invention is that the garbage collector may remove the receptacle merely by opening the gate 18, thus not requiring his entrance into the yard of the dwelling.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A casing including a movable section, a partition mounted within said section and providing an isolated chamber for the trapping of insects, means forming an entrance for insects to said chamber and communicating with the outside of said casing, said partition being designed to be moved into a position beyond said section, when the latter is opened, to permit the dumping of the insects out of said chamber, substantially as described.

2. A casing including two sections, one of said sections being movable and having an edge portion hinged to the other section, a partition mounted within said movable section and providing an isolated chamber for the trapping of insects, means forming an entrance for insects to said chamber and communicating with the outside of said movable section, said partition being designed to be slid into a position beyond said edge portion to permit the dumping of the insects out of said chamber when said movable section is opened, substantially as described.

3. A casing including two sections, one of said sections being movable and having an edge portion hinged to the other section, a partition mounted within said movable section and providing an isolated chamber for the trapping of insects, said movable section having a slot therein, a hollow baffle surrounding said slot and extending into said isolated chamber, said partition being designed to be slid into a position beyond said edge portion to form an opening in said chamber and thereby permit the dumping of the insects out of said chamber when said movable section is opened, substantially as described.

4. A casing including two sections, one of said sections being movable and having an edge portion hinged to the other section, a partition mounted within said movable section and providing an isolated chamber for the trapping of insects, said movable section having a slot therein, a hollow baffle surrounding said slot and communicating with said isolated chamber, said partition having an end portion normally forming an inclosure for said chamber and designed to be slid into a position beyond said edge portion of the movable section to open the chamber to permit the dumping of the insects out of said chamber when said movable section is opened, substantially as described.

5. A casing including two sections, one of said sections being movable and having an edge portion hinged to the other section, a partition mounted within said movable section and providing an isolated chamber for the trapping of insects, said movable section having a slot therein, a hollow baffle surrounding said slot and communicating with said isolated chamber, said partition having an end portion designed to be slid into a position beyond said edge portion of the movable section to form an opening in said chamber and thereby permit the dumping of the insects out of said chamber when said movable section is opened, means secured to said movable section and forming a guide-way for said partition to permit the latter to be slid into said position and to form a support for said partition while in said slid position, substantially as described.

6. A casing including a hinged section, a partition mounted within said section and providing an isolated chamber for the trapping of insects, and means in said hinged section forming an entrance for the insects into said chamber and communicating with the outside of said casing, said partition being designed to be moved beyond the hinged connection of the section when the latter is opened, substantially as described.

7. A casing including a movable section, a partition mounted within said section and providing an isolated chamber for the trapping of insects, means forming an entrance for insects to said chamber and communicating with the outside of said casing, said casing being perforated to permit the admission of light, substantially as described.

8. A casing including a movable section, a partition mounted within said section and providing, together with said movable section, an isolated chamber for the trapping of insects, and means forming an entrance for insects to said chamber and communicating with the outside of said section, substantially as described.

In testimony whereof I have signed my name to this specification in the presence of two subscribing witnesses.

GEORGE H. SIPP.

Witnesses:
AUGUSTUS B. COPPES,
C. R. ZIEGLER.

Copies of this patent may be obtained for five cents each, by addressing the "Commissioner of Patents, Washington, D. C."